United States Patent
Xia et al.

(10) Patent No.: US 12,411,071 B1
(45) Date of Patent: Sep. 9, 2025

(54) TEST SYSTEM AND METHOD FOR ACHIEVING THREE-DIRECTIONAL MULTIPHASE SEEPAGE IN TRUE TRIAXIAL LOADING PROCESS

(71) Applicant: Tianjin University, Tianjin (CN)

(72) Inventors: Kaiwen Xia, Tianjin (CN); Xing Li, Tianjin (CN); Ying Xu, Tianjin (CN); Junjie Xiao, Tianjin (CN); Jiacun Liu, Tianjin (CN); Bangbiao Wu, Tianjin (CN); Wei Yao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 19/216,790

(22) Filed: May 23, 2025

(30) Foreign Application Priority Data

Jun. 24, 2024 (CN) .......................... 202410827796.1

(51) Int. Cl.
*G01N 15/08* (2006.01)
(52) U.S. Cl.
CPC ....... *G01N 15/0806* (2013.01); *G01N 15/082* (2013.01)
(58) Field of Classification Search
CPC ............. G01N 15/082; G01N 15/0806; G01N 15/0826; G01N 33/24; G01N 2203/0256
USPC ............................................................. 73/38
See application file for complete search history.

(56) References Cited

U.S. PATENT DOCUMENTS 12,055,523 B1 * 8/2024 Li ............................. G01N 3/08

FOREIGN PATENT DOCUMENTS

| CN | 102735600 | A |   | 10/2012 |   |             |
|----|-----------|---|---|---------|---|-------------|
| CN | 104655495 | A | * | 5/2015  |   |             |
| CN | 111707538 | A | * | 9/2020  |   | G01N 15/0806 |
| CN | 115201016 | A | * | 10/2022 |   | G01N 3/12   |
| CN | 116124672 | A |   | 5/2023  |   |             |
| CN | 116148045 | A |   | 5/2023  |   |             |
| CN | 116296867 | A | * | 6/2023  |   | G01N 3/18   |
| CN | 117871277 | A | * | 4/2024  |   | G01N 15/0806 |
| WO | WO-2020048185 | A2 | * | 3/2020 |   | G01N 15/0826 |

OTHER PUBLICATIONS

Machine Translation of CN 104655495 A (Year: 2015).*

(Continued)

*Primary Examiner* — Nathaniel J Kolb
(74) *Attorney, Agent, or Firm* — Bayramoglu Law Offices LLC (57) ABSTRACT

The provided is a test system and method for achieving three-directional multiphase seepage in a true triaxial loading process. The test system includes a three-directional multiphase seepage loading cabin including a sample metal frame, a loading frame, an outer plate, a fluid injection module, a fluid recovery module, and six loading indenter modules as well as a fluid injection and measurement system; the sample metal frame is arranged at a center of the loading frame, the outer plate is arranged on the loading frame, the fluid injection module and the fluid recovery module are arranged respectively at an upper part and a lower part of the loading frame, and the fluid injection and measurement system is connected to the three-directional multiphase seepage loading cabin; and the loading indenter modules are arranged in the loading frame from six directions, and the indenters of the loading indenter modules are arranged.

7 Claims, 3 Drawing Sheets

(56) References Cited

OTHER PUBLICATIONS

Machine Translation of CN 111707538 A (Year: 2020).*
Machine Translation of CN 115201016 A (Year: 2022).*
Machine Translation of CN 116296867 A (Year: 2023).*
Machine Translation of CN 117871277 A (Year: 2024).*
Machine translation of WO 2020/048185 (Year: 2020).*

* cited by examiner

TEST SYSTEM AND METHOD FOR ACHIEVING THREE-DIRECTIONAL MULTIPHASE SEEPAGE IN TRUE TRIAXIAL LOADING PROCESS

CROSS REFERENCE TO THE RELATED APPLICATIONS

This application is based upon and claims priority to Chinese Patent Application No. 202410827796.1, filed on Jun. 24, 2024, the entire contents of which are incorporated herein by reference.

TECHNICAL FIELD

The present invention belongs to the field of test equipment for rock mechanics and seepage mechanics, and specifically relates to a test system and method for achieving three-directional multiphase seepage in a true triaxial loading process.

BACKGROUND

With the depletion of shallow resources, the mining and utilization of resources are gradually moving towards the deep earth. Some underground projects are as deep as one kilometer or even several kilometers. The rocks in this environment are subjected to a more complex geological environment, and the stress state often exhibits anisotropic characteristics, specifically a true triaxial stress state with unequal three directions. Meanwhile, the permeability of deep rocks is also affected by the stress state, so that the permeability also shows anisotropy.

However, due to the limitations of experimental equipment, the current research on the permeability characteristics of rocks under high stress states by scholars at home and abroad is mostly based on traditional triaxial stress conditions, that is, the situation where an intermediate principal stress is equal to a minimum principal stress. This is obviously inconsistent with the actual engineering conditions, which has affected the reliability and application value of the research results to a certain extent. Therefore, it is very necessary to study the changes in three-directional multiphase permeability of rocks under true triaxial stress conditions. At present, dozens of rock true triaxial testing machines have been developed at home and abroad. However, these existing true triaxial testing machines can only measure the permeability of a single phase in one direction during the test. At present, there is no true triaxial testing system capable of achieving the measurement of three-directional multiphase permeability in a high stress state.

SUMMARY

An objective of the present invention is to provide a test system and test method capable of achieving simultaneous measurement of true triaxial three-directional multiphase seepage, so as to address the gaps in existing test equipment and test methods.

To achieve the above objective, the present invention adopts the following technical solutions.

A test system for achieving three-directional multiphase seepage in a true triaxial loading process includes: a three-directional multiphase seepage loading cabin and a fluid injection and measurement system, wherein the fluid injection and measurement system is communicated with the three-directional multiphase seepage loading cabin; the three-directional multiphase seepage loading cabin includes a sample metal frame, a loading frame, an outer plate, a fluid injection module, a fluid recovery module, and six loading indenter modules; the sample metal frame is arranged at a center of the loading frame, the outer plate is arranged on the loading frame, the fluid injection module is arranged at an upper part of the loading frame, the fluid injection and measurement system is connected to the three-directional multiphase seepage loading cabin by the fluid injection module, the fluid recovery module is arranged at a lower part of the loading frame, and the fluid injection and measurement system is connected to the three-directional multiphase seepage loading cabin by the fluid recovery module; and the loading indenter modules are arranged in the loading frame from up, down, front, back, left and right directions, and the loading indenters of the six loading indenter modules are arranged in the sample metal frame and contact a sample.

Further, the fluid injection and measurement system includes a constant-current and constant-pressure pump and a fluid storage device, a rear part of the constant-current and constant-pressure pump is communicated with the fluid storage device, a fluid channel is integrated into each loading indenter module, and the constant-current and constant-pressure pump is connected to the three-directional multiphase seepage loading cabin by a fluid channel.

Further, a rubber sealing ring is arranged inside the sample metal frame.

Further, a Y+loading indenter module is arranged at the upper part of the loading frame; an upper boundary of the loading frame is connected to the Y+loading indenter module by an upper outer plate; Y+direction force and displacement sensors are distributed inside the Y+loading indenter module; when an experiment is performed, a top of the Y+loading indenter module is connected to a Y+static loading module; a Y+fluid channel is distributed inside the Y+loading indenter module; and the Y+fluid channel is connected to the fluid injection module or the fluid recovery module.

Further, a Y−loading indenter module is arranged at the lower part of the loading frame; a lower boundary of the loading frame is connected to the Y−loading indenter module by a lower outer plate; Y−direction force and displacement sensors are distributed inside the Y−loading indenter module; when an experiment is performed, a top of the Y−loading indenter module is connected to a Y−static loading module; a Y−fluid channel is distributed inside the Y−loading indenter module; and the Y−fluid channel is connected to the fluid injection module or the fluid recovery module.

Further, an X+loading indenter module is arranged at a right part of the loading frame; a right boundary of the loading frame is connected to the X+loading indenter module by a right outer plate; X+direction force and displacement sensors are distributed inside the X+loading indenter module; when an experiment is performed, a top of the X+loading indenter module is connected to an X+static loading module; an X+fluid channel is distributed inside the X+loading indenter module; and the X+fluid channel is connected to the fluid injection module or the fluid recovery module.

Further, an X−loading indenter module is arranged at a left part of the loading frame; a left boundary of the loading frame is connected to the X−loading indenter module by a left outer plate; X−direction force and displacement sensors are distributed inside the X−loading indenter module; when an experiment is performed, a top of the X-loading indenter module is connected to an X-static loading module; an X-fluid channel is distributed inside the X-loading indenter module; and the X-fluid channel is connected to the fluid injection module or the fluid recovery module.

Further, a Z+loading indenter module is arranged at a front part of the loading frame; a front boundary of the loading frame is connected to the Z+loading indenter module by a front outer plate; Z+direction force and displacement sensors are distributed inside the Z+loading indenter module; when an experiment is performed, a top of the Z+loading indenter module is connected to a Z+static loading module; a Z+fluid channel is distributed inside the Z+loading indenter module; and the Z+fluid channel is connected to the fluid injection module or the fluid recovery module.

Further, a Z-loading indenter module is arranged at a rear part of the loading frame; a rear boundary of the loading frame is connected to the Z-loading indenter module by a rear outer plate; Z-direction force and displacement sensors are distributed inside the Z-loading indenter module; when an experiment is performed, a top of the Z-loading indenter module is connected to a Z-static loading module; a Z-fluid channel is distributed inside the Z-loading indenter module; and the Z-fluid channel is connected to the fluid injection module or the fluid recovery module.

A test method for a test system for achieving three-directional multiphase seepage in a true triaxial loading process includes the following test steps:

S1. sample preparation stage: processing a rock block into a standard cubic rock sample of 100 mm×100 mm×100 mm, wherein a side length of each sample is 6 mm greater than a side length of an indenter, and this length is a reserved distance of the indenter to prevent the indenter from colliding in different directions in the loading process; then chamfering the standard cubic rock sample to reduce stress concentration in the loading process and achieve effective sealing on a sample boundary in the seepage test, and twelve edges are chamfered at an angle of 45° and a depth of 3 mm;

S2. sample installation stage: installing the rubber sealing ring in the metal frame of the true triaxial three-directional multiphase seepage loading cabin, and installing the prepared sample 7 in the metal frame by using a special loading and unloading device; then installing a Y-loading indenter module at the lower part of the loading frame; installing the metal frame with the sample 7 on the Y-loading indenter module; installing other loading indenter modules and all seepage pipes in the remaining five directions;

S3. equipment inspection stage: opening a hydraulic source, a computer and an oscilloscope, observing whether all displacement sensors, force sensors and seepage pipes are abnormal, and performing a next step if there is no abnormal condition;

S4. preload application stage: servo-controlling six loading indenters in three directions of X, Y, and Z to symmetrically and slowly apply force to 10 kN, and after the loading is completed and stabilized for one minute, proceeding to a next step;

S5. static loading stage: loading to a first preset stress state by adopting a force control mode and different loading speeds according to a test plan design;

S6. sealing pressure loading stage: loading to a preset pressure state at a constant speed by using a sealing pressure booster pump;

S7. three-directional multiphase seepage loading stage: after the preset stress state and the sealing pressure are reached, injecting different flow fluids at different flow rates in each of main stress directions by using the constant-current and constant-pressure pump in sequence, and calculating permeability in each direction after the seepage is stable; after the seepage test is completed in a current stress state, closing the constant-current and constant-pressure pump, and releasing pore pressure;

S8. subsequent test stage: after the three-directional multiphase seepage test of the previous preset stress state is completed, loading to a second preset stress state by adopting a force control mode and different loading speeds according to a test plan design; performing corresponding three-directional multiphase seepage loading in this stress state, and so on;

S9. unloading stage: after the test is completed, closing the constant-current and constant-pressure pump firstly, stopping seepage loading, then closing the sealing pressure booster pump, reducing the sealing pressure to zero, and then slowly reducing stresses in three directions of X, Y, and Z symmetrically and synchronously to zero, so as to avoid sample damage resulted from a deviation stress caused by unloading too quickly or unloading in the three directions asynchronously;

S10. end of test: after unloading is completed, taking out the sample, observing a sample shape, and complete the test; and S11. cleaning the indenters and debris of the sample in a pressure chamber, and turning off the water and electricity.

The beneficial effects of the present invention are as follows.

Compared with the existing true triaxial testing machine, the present invention has the advantages that the three-directional multiphase seepage test can be simultaneously achieved under the condition of true triaxial stress; under the action of sealing pressure, a sealing ring is tightly attached to an inner wall of a triaxial chamber frame, a side surface of a sample cushion block and twelve edges of the sample so as to ensure sealing of adjacent surfaces of the sample, the permeability of the sample in three main stress directions may be measured simultaneously, the sealing pressure is not less than 25 MPa, and the precision is +0.2 MPa. Two independently controlled plunger pump systems are required for seepage and sealing; the seepage loading device adopts a full-digital dynamic servo controller, and can inject fluid (gas) with different flow (pressure) according to different flow speeds, wherein a maximum output pressure is 25 MPa, which cannot be achieved by other existing true triaxial testing machines.

DESCRIPTIONS OF REFERENCE NUMERALS

1: three-directional multiphase seepage loading cabin; 2: sample metal frame; 3: loading frame;

4: outer plate; 4-1: upper outer plate, 4-2: lower outer plate, 4-3: right outer plate, 4-4: left outer plate, 4-5: front outer plate, and 4-6: rear outer plate;

5: fluid channel; 5-1: Y+fluid channel, 5-2: Y−fluid channel, 5-3: X+fluid channel, 5-4: X−fluid channel, 5-5: Z+fluid channel, and 5-6: Z−fluid channel;

6: loading indenter; 6-1: Y+loading indenter, 6-2: Y−loading indenter, 6-3: X+loading indenter, 6-4: X−loading indenter, 6-5: Z+loading indenter, and 6-6: Z−loading indenter;

7: sample; 8: rubber seal ring; 9: fluid injection and measurement system; 10: constant-current and constant-pressure pump; and 11: fluid reservoir.

DETAILED DESCRIPTION OF THE EMBODIMENTS

The technical solutions in the embodiments of the present invention will be clearly and fully described below with reference to the drawings in the embodiments of the present invention.

In the description of the present invention, it should be noted that directions or positional relationships indicated by terms "central", "upper", "lower", "left", "right", "horizontal", "inner", "outer", "one side", and the like are those shown based on the accompanying drawings, and are merely intended to facilitate and simplify description rather than indicate or imply that the indicated apparatus or element must have a specific direction and must be configured and operated according to the specific direction. Therefore, these directions or positional relationships should not be construed as limiting the present invention. The terms "first", "second", and "third" are used herein for descriptive purposes only and should not be construed as indicating or implying relative importance. In addition, unless otherwise expressly specified and limited, terms "install", "interconnect", and "connect" should be understood in a broad sense. For example, such terms may indicate a fixed connection, a detachable connection, or an integral connection; may indicate a mechanical connection or an electrical connection; and may indicate direct interconnection, indirect interconnection through an intermediate medium, or internal communication between two elements. For those of ordinary skill in the art, the specific meanings of the aforementioned terms in the present invention can be understood according to specific conditions.

Embodiment 1

Figure 1:
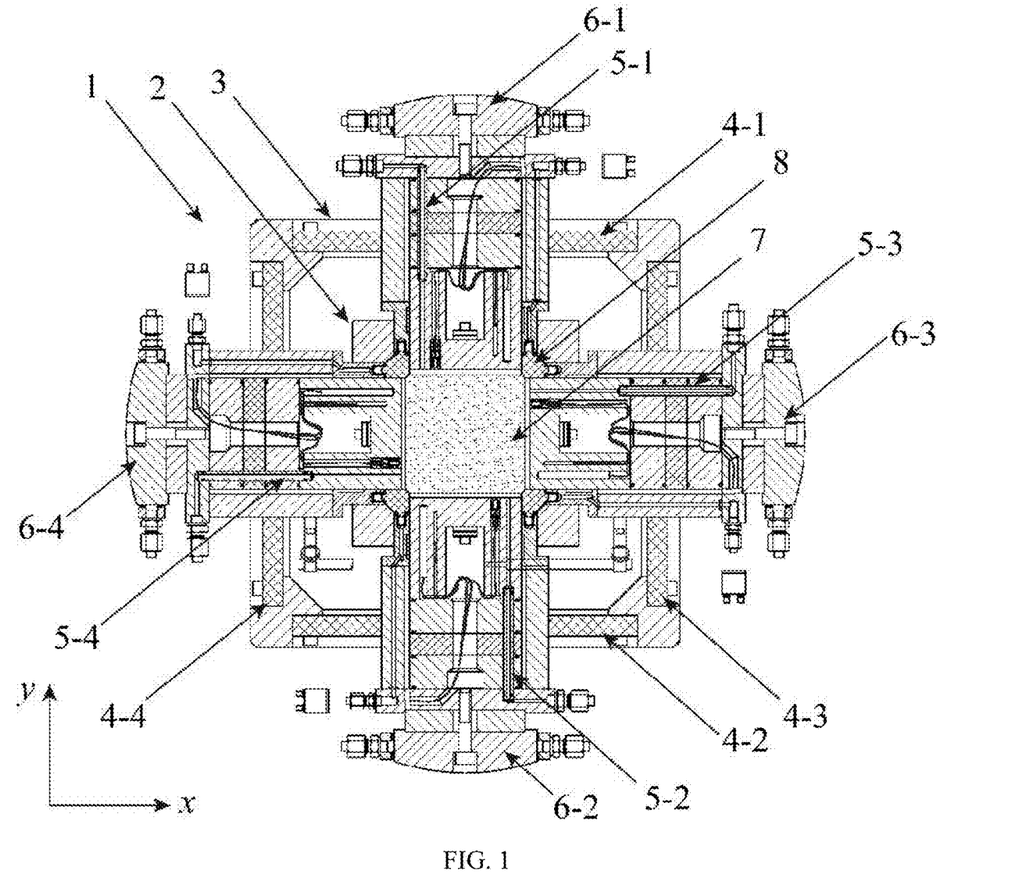
FIG. 1 is a schematic diagram of an internal structure of a true triaxial three-directional multiphase seepage loading chamber according to the present invention.
Figure 2:
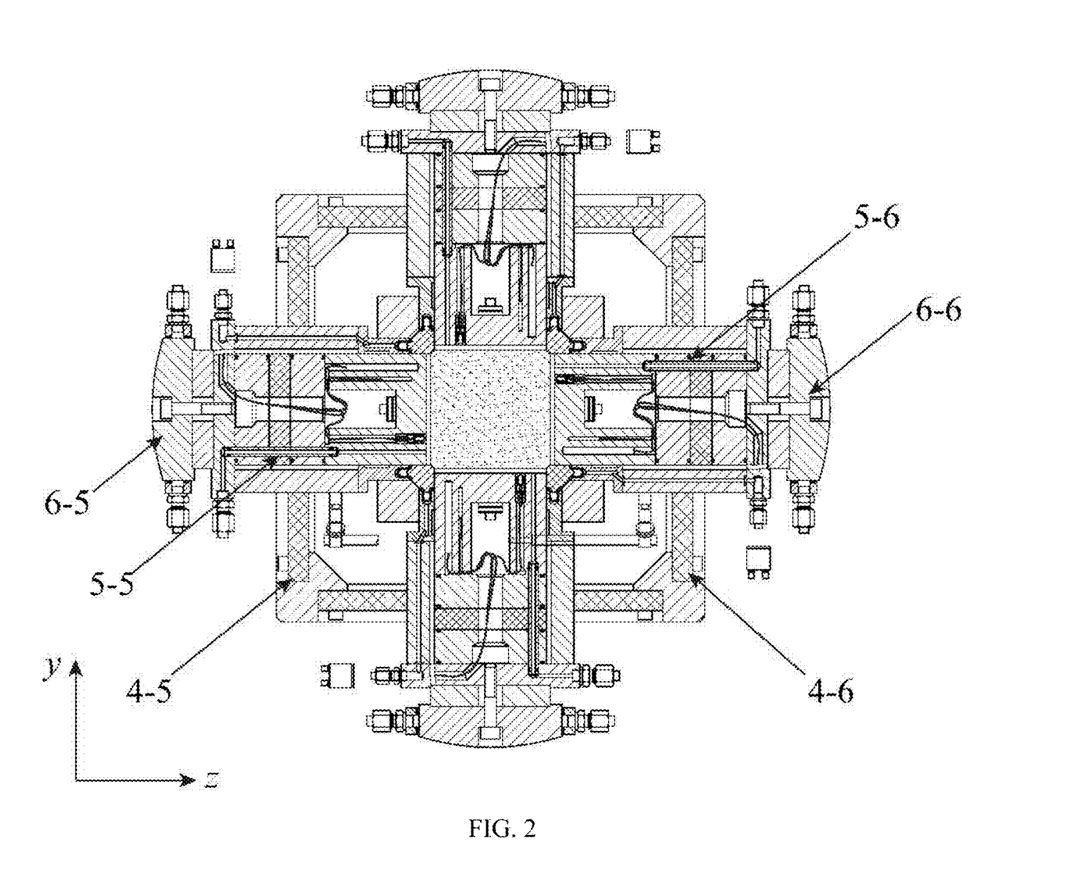
FIG. 2 is a schematic diagram of an internal structure of a true triaxial three-directional multiphase seepage loading chamber of the present invention.
Figure 3:
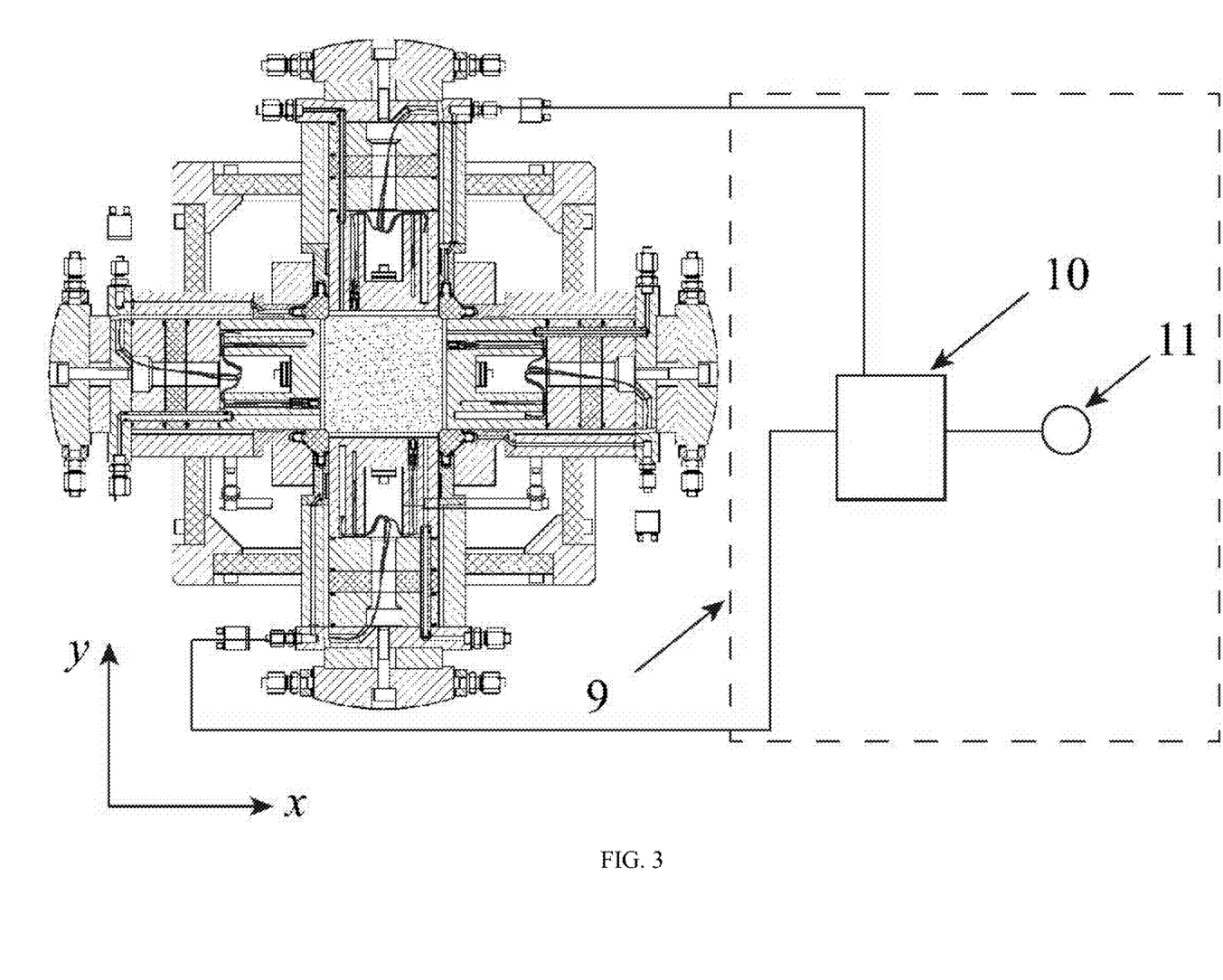
FIG. 3 is a schematic diagram of the connection between a true triaxial three-directional multiphase seepage loading chamber and a fluid injection and measurement system according to the present invention.

As shown in FIGS. 1-3, a test system for achieving three-directional multiphase seepage in a true triaxial loading process includes: a three-directional multiphase seepage loading cabin 1 and a fluid injection and measurement system 9.

The three-directional multiphase seepage loading cabin 1 includes a sample metal frame 2, a loading frame 3, an outer plate 4, a fluid injection module, a fluid recovery module, and six loading indenter modules; the sample metal frame 2 is arranged at a center of the loading frame 3, the outer plate 4 is arranged on the loading frame 3, the fluid injection module is arranged at an upper part of the loading frame 3, the fluid injection and measurement system is connected to the three-directional multiphase seepage loading cabin 1 by the fluid injection module, the fluid recovery module is arranged at a lower part of the loading frame 3, and the fluid injection and measurement system is connected to the three-directional multiphase seepage loading cabin 1 by the fluid recovery module; and the loading indenter modules are arranged in the loading frame 3 from up, down, front, back, left and right directions, and the loading indenters 6 of the six loading indenter modules are arranged in the sample metal frame 2 and contact a sample 7.

The fluid injection and measurement system 9 includes a constant-current and constant-pressure pump 10 and a fluid storage device 11, a rear part of the constant-current and constant-pressure pump 10 is communicated with the fluid storage device 11, a fluid channel 5 is integrated into each loading indenter module, and the constant-current and constant-pressure pump 10 is connected to the three-directional multiphase seepage loading cabin 1 by a fluid channel 5.

As a preferred embodiment of the present invention, a rubber sealing ring 8 is arranged inside the sample metal frame 2, so that the sealing property of the sample 7 can be ensured.

Specifically, a Y+loading indenter module 6-1 is arranged at the upper part of the loading frame 3; an upper boundary of the loading frame 3 is connected to the Y+loading indenter module 6-1 by an upper outer plate 4-1; Y+direction force and displacement sensors are distributed inside the Y+loading indenter module 6-1; when an experiment is performed, a top of the Y+loading indenter module 6-1 is connected to a Y+static loading module; a Y+fluid channel 5-1 is distributed inside the Y+loading indenter module 6-1; and the Y+fluid channel 5-1 is connected to the constant-current and constant-pressure pump 10.

A Y−loading indenter module 6-2 is arranged at the lower part of the loading frame 3; a lower boundary of the loading frame 3 is connected to the Y−loading indenter module 6-2 by a lower outer plate 4-2; Y−direction force and displacement sensors are distributed inside the Y−loading indenter module 6-2; when an experiment is performed, a top of the Y−loading indenter module 6-2 is connected to a Y−static loading module; a Y−fluid channel 5-2 is distributed inside the Y−loading indenter module 6-2; and the Y−fluid channel 5-2 is connected to the constant-current and constant-pressure pump 10.

An X+loading indenter module 6-3 is arranged at a right part of the loading frame 3; a right boundary of the loading frame 3 is connected to the X+loading indenter module 6-3 by a right outer plate 4-3; X+direction force and displacement sensors are distributed inside the X+loading indenter module 6-3; when an experiment is performed, a top of the X+loading indenter module 6-3 is connected to an X+static loading module; an X+fluid channel 5-3 is distributed inside the X+loading indenter module 6-3; and the X+fluid channel 5-3 is connected to the constant-current and constant-pressure pump 10.

An X−loading indenter module 6-4 is arranged at a left part of the loading frame 3; a left boundary of the loading frame 3 is connected to the X−loading indenter module 6-4 by a left outer plate 4-4; X−direction force and displacement sensors are distributed inside the X−loading indenter module 6-4; when an experiment is performed, a top of the X−loading indenter module 6-4 is connected to an X−static loading module; an X−fluid channel 5-4 is distributed inside the X−loading indenter module 6-4; and the X−fluid channel 5-4 is connected to the constant-current and constant-pressure pump 10.

A Z+loading indenter module 6-5 is arranged at a front part of the loading frame 3; a front boundary of the loading frame 3 is connected to the Z+loading indenter module 6-5 by a front outer plate 4-5; Z+direction force and displacement sensors are distributed inside the Z+loading indenter module 6-5; when an experiment is performed, the top of the Z+loading indenter module 6-5 is connected to a Z+static loading module; a Z+fluid channel 5-5 is distributed inside the Z+loading indenter module 6-5; and the Z+fluid channel 5-5 is connected to the constant-current and constant-pressure pump 10.

A Z−loading indenter module 6-6 is arranged at a rear part of the loading frame 3; a rear boundary of the loading frame 3 is connected to the Z−loading indenter module 6-6 by a rear outer plate 4-6; Z−direction force and displacement sensors are distributed inside the Z−loading indenter module 6-6; when an experiment is performed, the top of the Z−loading indenter module 6-6 is connected to a Z−static loading module; a Z−fluid channel 5-6 is distributed inside the Z−loading indenter module 6-6; and the Z−fluid channel 5-6 is connected to the constant-flow and constant-pressure pump 10.

Embodiment 2

This embodiment discloses a test method for a test system for achieving three-directional multiphase seepage based on a true triaxial loading process, which includes the following specific steps:

- S1. sample preparation stage: processing a rock block into a standard cubic rock sample 7 of 100 mm×100 mm×100 mm, wherein a side length of each sample 7 is 6 mm greater than a side length of an indenter, and this length is a reserved distance of the indenter to prevent the indenter from colliding in different directions in the loading process; then chamfering the standard cubic rock sample to reduce stress concentration in the loading process and achieve effective sealing on a sample boundary in the seepage test, and twelve edges are chamfered at an angle of 45° and a depth of 3 mm;
- S2. sample installation stage: installing the rubber sealing ring 8 in the metal frame 2 of the true triaxial three-directional multiphase seepage loading cabin 1, and installing the prepared sample 7 in the metal frame 2 by using a special loading and unloading device; then installing a Y−loading indenter module 6-2 at the lower part of the loading frame 3; installing the metal frame 2 with the sample 7 on the Y−loading indenter module 6-2; installing other loading indenter modules and all seepage pipes in the remaining five directions by a special device;
- S3. equipment inspection stage: opening a hydraulic source, a computer and an oscilloscope, observing whether all displacement sensors, force sensors and seepage pipes are abnormal, and performing a next step if there is no abnormal condition;
- S4. preload application stage: servo-controlling six loading indenters 6 in three directions of X, Y, and Z to symmetrically and slowly apply force to about 10 kN, and after the loading is completed and stabilized for one minute, proceeding to a next step;
- S5. static loading stage: loading to a first preset stress state by adopting a force control mode and different loading speeds according to a test plan design;
- S6. sealing pressure loading stage: loading to a preset pressure state at a constant speed by using a sealing pressure booster pump;
- S7. three-directional multiphase seepage loading stage: after the preset stress state and the sealing pressure are reached, injecting fluid (gas) with different flow rates (pressures) in each of main stress directions by using the constant-current and constant-pressure pump 10 in sequence, and calculating permeability in each direction after the seepage is stable; after the seepage test is completed in a current stress state, closing the constant-current and constant-pressure pump 10, and releasing pore pressure;
- S8. subsequent test stage: after the three-directional multiphase seepage test of the previous preset stress state is completed, loading to a second preset stress state by adopting a force control mode and different loading speeds according to a test plan design; performing corresponding three-directional multiphase seepage loading in this stress state, and so on;
- S9. unloading stage: after the test is completed, closing the constant-current and constant-pressure pump firstly, stopping seepage loading, then closing the sealing pressure booster pump, reducing the sealing pressure to zero, and then slowly reducing stresses in three directions of X, Y, and Z symmetrically and synchronously to zero, so as to avoid the damage to the sample 7 resulted from a deviation stress caused by unloading too quickly or unloading in the three directions asynchronously;
- S10. end of test: after unloading is completed, taking out the sample 7, observing a sample shape, and complete the test; and
- S11. cleaning the indenters and debris of the sample in a pressure chamber, and turning off the water and electricity.

Although the embodiments of the present invention have been described with reference to the accompanying drawings, it is not intended to limit the scope of the present invention. It should be understood by those skilled in the art that, based on the technical solution of the present invention, various modifications or variations that can be made by those skilled in the art without creative work are still within the protection scope of the present invention.

What is claimed is:

1. A test method for a test system for achieving a three-directional multiphase seepage in a true triaxial loading process, wherein the test system comprises: a true triaxial three-directional multiphase seepage loading cabin and a fluid injection and measurement system, wherein the fluid injection and measurement system is communicated with the true triaxial three-directional multiphase seepage loading cabin;

the true triaxial three-directional multiphase seepage loading cabin comprises a sample metal frame, a loading frame, an outer plate, a fluid injection module, a fluid recovery module, and six loading indenter modules; the sample metal frame is arranged at a center of the loading frame, a rubber sealing ring is arranged inside the sample metal frame, the outer plate is arranged on the loading frame, the fluid injection module is arranged at an upper part of the loading frame, the fluid injection and measurement system is connected to the true triaxial three-directional multiphase seepage loading cabin by the fluid injection module, the fluid recovery module is arranged at a lower part of the loading frame, and the fluid injection and measurement system is connected to the true triaxial three-directional multiphase seepage loading cabin by the fluid recovery module; the six loading indenter modules are arranged in the loading frame from up, down, front, back, left, and right directions, and loading indenters of the six loading indenter modules are arranged in the sample metal frame and contact a sample; a force sensor and a displacement sensor are distributed in each of the six loading indenter modules; and each of the six loading indenter modules is connected to a static loading module at an end distal to the sample;

the fluid injection and measurement system comprises a constant-current and constant-pressure pump and a fluid storage device, a rear part of the constant-current and constant-pressure pump is communicated with the fluid storage device, a fluid channel is integrated into each of the six loading indenter modules, and the constant-current and constant-pressure pump is connected to the true triaxial three-directional multiphase seepage loading cabin by the fluid channel;

the test method comprises the following test steps:

S1, a sample preparation stage: processing a rock block into a standard cubic rock sample of 100 mm×100 mm×100 mm, wherein a side length of each sample is 6 mm greater than a side length of an indenter, and a length of 6 mm is a reserved distance of the indenter to prevent the indenters from colliding with each other in the true triaxial loading process; and then chamfering the standard cubic rock sample to reduce stress concentration in the true triaxial loading process and achieve effective sealing on a sample boundary in a seepage test, wherein twelve edges are chamfered at an angle of 45° and a depth of 3 mm;

S2, a sample installation stage: installing the rubber sealing ring in the sample metal frame of the true triaxial three-directional multiphase seepage loading cabin, and installing the sample in the sample metal frame; then installing a loading indenter module at the lower part of the loading frame; installing the sample metal frame with the sample on each of the six loading indenter modules; and installing five loading indenter modules and all seepage pipes in remaining five directions;

S3, an equipment inspection stage: opening a hydraulic source, a computer, and an oscilloscope, observing whether all displacement sensors, force sensors, and the seepage pipes are abnormal, and proceeding to a preload application stage when there is no abnormal condition;

S4, the preload application stage: servo-controlling six loading indenters in three directions of X, Y, and Z to symmetrically and slowly apply a force to 10 kN, and after loading is completed and stabilized for one minute, proceeding to a static loading stage;

S5, the static loading stage: loading to a first preset stress state by adopting a force control mode and different loading speeds according to a test plan design;

S6, a sealing pressure loading stage: loading to a preset pressure state at a constant speed by using a sealing pressure booster pump;

S7, a three-directional multiphase seepage loading stage: after the first preset stress state and a sealing pressure are reached, injecting different flow fluids at different flow rates in each of main stress directions by using the constant-current and constant-pressure pump in sequence, and calculating a permeability in each of the main stress directions after a seepage is stable; and after the seepage test is completed in a current stress state, closing the constant-current and constant-pressure pump, and releasing a pore pressure;

S8, a subsequent test stage: after the seepage test of the first preset stress state is completed, loading to a second preset stress state by adopting the force control mode and the different loading speeds according to the test plan design; and performing corresponding three-directional multiphase seepage loading in a current stress state, and so on;

S9, an unloading stage: after the seepage test is completed, closing the constant-current and constant-pressure pump, stopping seepage loading, then closing the sealing pressure booster pump, reducing the sealing pressure to zero, and then slowly reducing stresses in the three directions of X, Y, and Z symmetrically and synchronously to zero to avoid sample damage resulting from a deviation stress caused by unloading too quickly or unloading in the three directions asynchronously;

S10, an end of the seepage test: after unloading is completed, taking out the sample, observing a sample shape, and completing the seepage test; and S11, cleaning the indenters and debris of the sample in a pressure chamber, and turning off water and electricity.

2. The test method for the test system for achieving the three-directional multiphase seepage in the true triaxial loading process according to claim 1, wherein a Y+loading indenter module is installed at the upper part of the loading frame; an upper boundary of the loading frame is connected to the Y+loading indenter module by an upper outer plate; a Y+fluid channel is distributed inside the Y+loading indenter module; and the Y+fluid channel is connected to the fluid injection module.

3. The test method for the test system for achieving the three-directional multiphase seepage in the true triaxial loading process according to claim 1, wherein a Y−loading indenter module is installed at the lower part of the loading frame; a lower boundary of the loading frame is connected to the Y−loading indenter module by a lower outer plate; a Y−fluid channel is distributed inside the Y−loading indenter module; and the Y−fluid channel is connected to the fluid recovery module.

4. The test method for the test system for achieving the three-directional multiphase seepage in the true triaxial loading process according to claim 1, wherein an X+loading indenter module is installed at a right part of the loading frame; a right boundary of the loading frame is connected to the X+loading indenter module by a right outer plate; an X+fluid channel is distributed inside the X+loading indenter module; and the X+fluid channel is connected to the fluid injection module or the fluid recovery module.

5. The test method for the test system for achieving the three-directional multiphase seepage in the true triaxial loading process according to claim 1, wherein an X−loading indenter module is installed at a left part of the loading frame; a left boundary of the loading frame is connected to the X−loading indenter module by a left outer plate; an X−fluid channel is distributed inside the X−loading indenter module; and the X−fluid channel is connected to the fluid injection module or the fluid recovery module.

6. The test method for the test system for achieving the three-directional multiphase seepage in the true triaxial loading process according to claim 1, wherein a Z+loading indenter module is installed at a front part of the loading frame; a front boundary of the loading frame is connected to the Z+loading indenter module by a front outer plate; a Z+fluid channel is distributed inside the Z+loading indenter module; and the Z+fluid channel is connected to the fluid injection module or the fluid recovery module.

7. The test method for the test system for achieving the three-directional multiphase seepage in the true triaxial loading process according to claim 1, wherein a Z−loading indenter module is installed at a rear part of the loading frame; a rear boundary of the loading frame is connected to the Z-loading indenter module by a rear outer plate; a Z-fluid channel is distributed inside the Z-loading indenter module; and the Z-fluid channel is connected to the fluid injection module or the fluid recovery module.

\* \* \* \* \*